United States Patent
Bourgoin et al.

[11] 3,725,685
[45] Apr. 3, 1973

[54] SYSTEM FOR ADJUSTING THE VALUE OF A RESISTANCE TO A PREDETERMINED VALUE

[75] Inventors: Gerard Bourgoin, 93 Romainville; Pierre Kumurdjian, 91 Saint-Cheron; Alain Loitière, 91 Wissous; Jean-François Péré, 94 Ivry, all of France

[73] Assignee: Commissariat A L'Energie Atomique, Paris, France

[22] Filed: May 25, 1971

[21] Appl. No.: 146,634

[52] U.S. Cl. ............ 235/151.1, 219/497, 324/63
[51] Int. Cl. ........................................ G06g 7/48
[58] Field of Search...235/151.1, 151, 151.3, 151.31; 338/7, 8, 13, 20, 22, 23, 24; 219/482, 489, 490, 491, 492, 494, 497, 504; 324/57, 57 PS, 63, 62; 323/66, 94, 68

[56] References Cited

UNITED STATES PATENTS

| | | | |
|---|---|---|---|
| 3,406,335 | 10/1968 | Magee et al. | 324/62 R |
| 3,548,155 | 12/1970 | Rabindran | 219/497 |
| 3,548,295 | 12/1970 | Borer | 323/68 |
| 3,564,204 | 2/1971 | Mense | 219/497 |
| 3,566,151 | 2/1971 | Wilburn | 219/497 X |

Primary Examiner—Joseph F. Ruggiero
Attorney—Cameron, Kerkam & Sutton

[57] ABSTRACT

The value R of a resistance is adjusted to a predetermined value $R_o$, R being modified by oxidation of the resistance by the flow therethrough of an electrical pulse train, by at least two read-in circuits, one for reading-in the value $R_o$ and the other for reading-in the required accuracy of the value R. A comparator having two inputs, one of the inputs having two terminals is connected across the resistance while the other input is connected to the read-in circuit for the value $R_o$. The comparator compares R and $R_o$. A store and control circuit whose input is connected to the comparator output determines the power of the first electrical pulse and the power increment of the pulses, the pulse power possibly being initially zero. A generator produces the pulses and the generator input is connected to the store and control circuit output. The generator output may be connected to at least one of the two ends of the resistance of value R. A clock circuit is connected to the generator and selects the repetition frequency and the average width of the pulses. A selector connects the terminals of the resistance of value R alternately to the comparator input terminals and to the generator output terminals.

7 Claims, 7 Drawing Figures

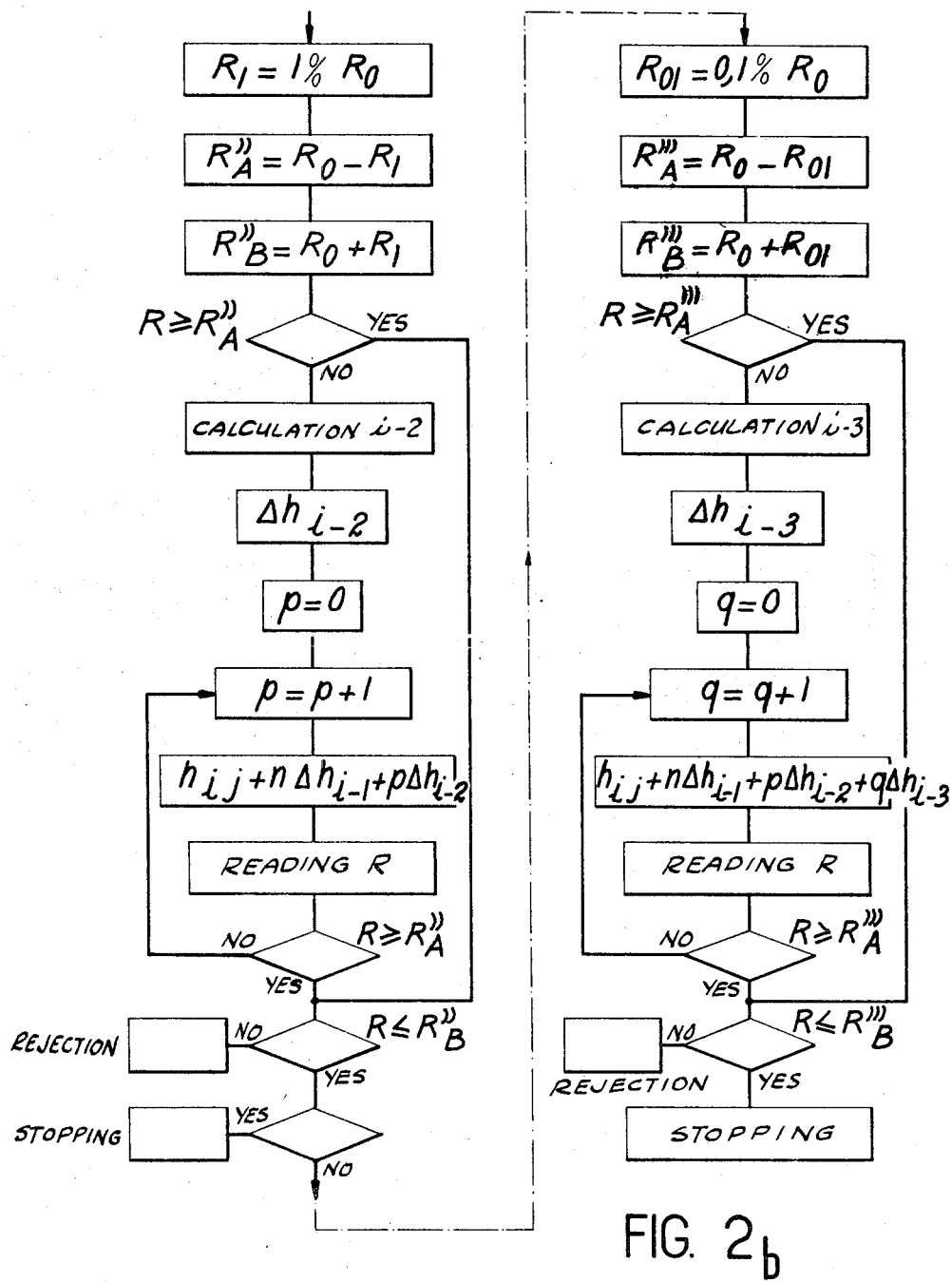

SYSTEM FOR ADJUSTING THE VALUE OF A RESISTANCE TO A PREDETERMINED VALUE

This invention relates to a system for adjusting the value of a resistance to a predetermined value. The resistance which it is required to adjust can, with advantage, be a resistance embodied by a thin layer of metal evaporated on a substrate, a kind of resistance commonly used in thin-layer electronic microcircuits.

There are various ways of altering the value of a resistance, most of them based on reducing the volume of resistive metal. For instance, the layer of metal forming the resistance can be scratched or scored either by a diamond tip or by a sand blast or by a laser beam which evaporates some of the metal. The resistance can be surface-oxidized, in which event its value increases. Oxidation is given either by electrolysis or by heating in air. All these methods have a number of disadvantages. Scratching makes the resistance very weak at the resulting constriction. Electrolytic oxidation of the resistance may contaminate the circuit. Most of these procedures take relatively long to perform — more than 30 seconds — and cannot be used for the small (smaller than 50 microns) resistances such as are used e.g., in integrated monolithic circuits.

The known process used in the system according to this invention is based on oxidation of the resistance by heating in the atmosphere, the heating being produced by a train of electrical pulses flowing through the actual resistance. The value of the resistance given this oxidation treatment can increase or decrease. The direction of variation of the resistance in dependence upon temperature must therefore be known and the initial resistance value must be higher or lower than the value required after adjustment. Systems are already known for adjusting the value of a resistance by consecutive approach to the required value by means of electric pulses which recur at a predetermined repetition frequency. However, every endeavour is made in such systems to obviate oxidation of the resistance by heating, and so the resistance requires preparation, for instance, by being covered with a protective layer of oxidation-inhibiting silica. Another disadvantage is that accuracy is fairly low.

The invention provides a system which performs better than the prior art systems, *inter alia* because adjustment of the resistance takes very little time, the resistance to be adjusted requires no pretreatment, and the adjusted value of the resistance is achieved with very great accuracy.

More particularly, the invention relates to a system for adjusting the value R of a resistance to a predetermined value $R_o$, R being modified by oxidation of the resistance by the flow therethrough of an electrical pulse train, characterized in that the system comprises at least two read-in circuits, one for reading-in the value $R_o$ and the other for reading-in the required accuracy of the value R, a comparator having two inputs, one of the inputs having two terminals and being connectable across the resistance while the other input is connected to the read-in circuit for the value $R_o$, the comparator comparing R and $R_o$, a store and control circuit whose input is connected to the comparator output and which determines the power of the first electrical pulse and the power increment of the pulses, the pulse power possibly being initially zero, a generator producing the pulses, the generator input being connected to the store and control circuit output, the generator output possibly being connected to at least one of the two ends of the resistance of value R, a clock circuit connected to the generator and serving as a means of selecting the repetition frequency and the average width of the pulses, and a selector which connects the terminals of the resistance of value R alternately to the comparator input terminals and to the generator output terminals.

The invention will be more clearly understood from the following description of two exemplary non-limitative embodiments of the invention, reference being made to the accompanying drawings wherein:

FIGS. 2a and 2b show the organization chart of the first embodiment of the system using logic systems;

Figure 5:
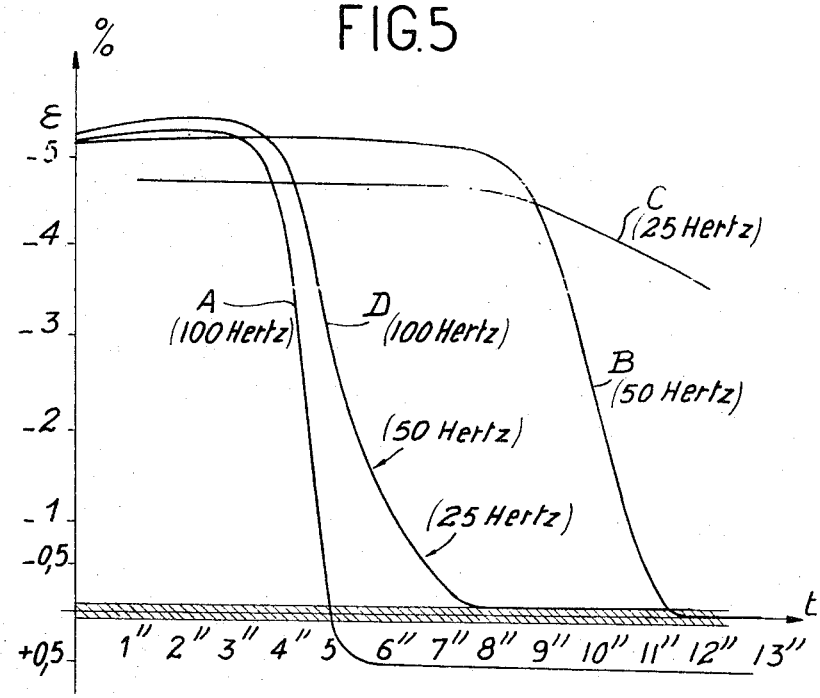
Figure 6:
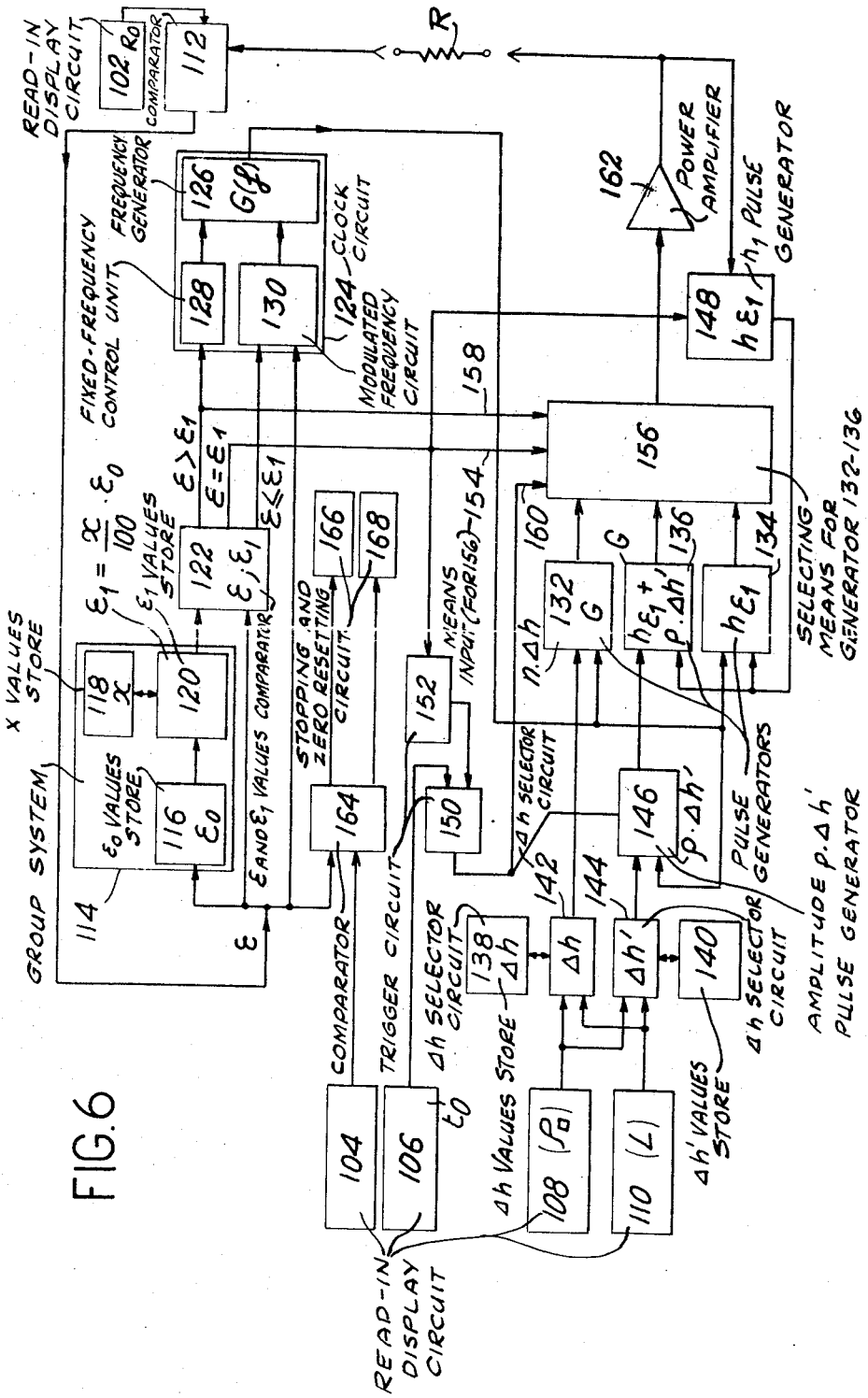

FIG. 5 represents the difference $R - R_o$ as a percentage plotted against the resistance adjustment time $t$, the curves A, B and C corresponding to fixed pulse repetition frequencies of 100, 50 and 25 Hz while the curve D corresponds to repetition frequencies which can vary sequentially during the adjusting operation, and FIG. 6 is a block schematic diagram of the second embodiment of the invention.

In the first embodiment according to the invention, the power of the first pulse of a train of electric pulses flowing through a resistance whose value it is required to adjust is selected in dependence upon the value, nature and dimensions of the resistance. The power of the various consecutive pulses increases, and the power increment between two consecutive pulses depends upon the difference $(R - R_o)$ and upon the end value of R. Adjustment is therefore performed very rapidly — in something like 10 seconds — and the adjusted value is accurate to very close limits. The power increment can be based on modification of one or more of the following parameters: pulse height (voltage variation), average width (duration) and repetition frequency. The invention can be embodied in various forms, on a digital or analog or on an analog-to-digital basis. Whatever the form adopted, the system according to the invention can be represented by the overall schematic view of FIG. 1.

Figure 1:
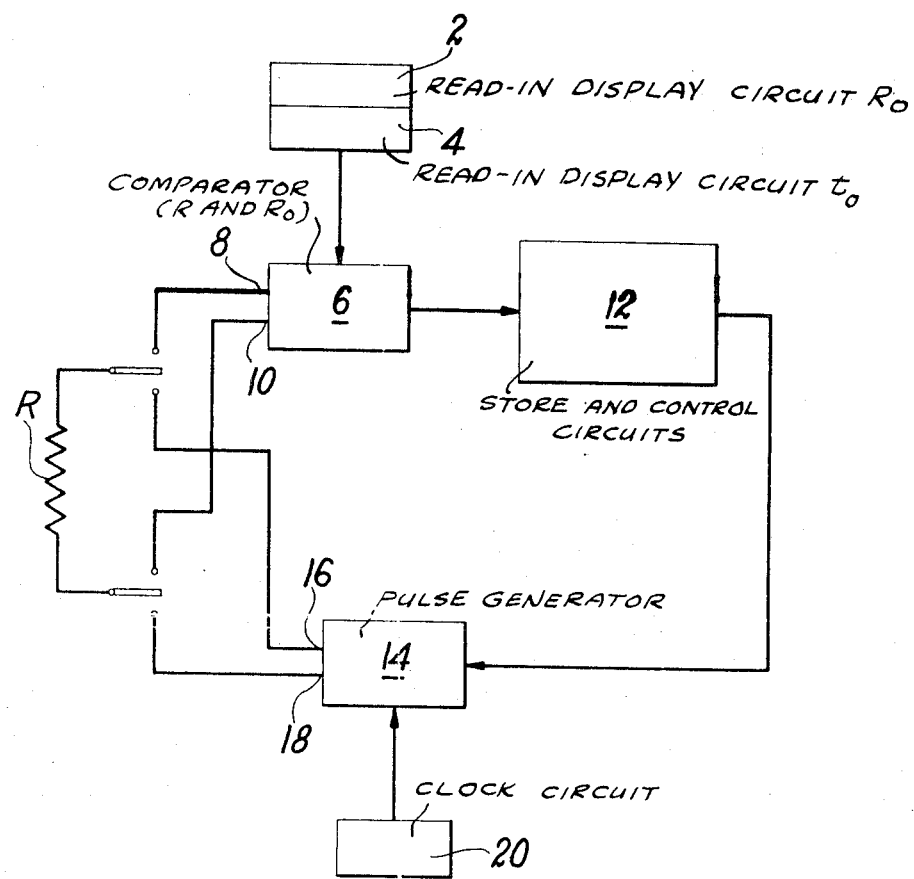
FIG. 1 is an overall block schematic diagram of the system according to the invention.

The system of FIG. 1 comprises two read-in circuits, a read-in circuit 2 for the value $R_o$ representing the required end-of-adjustment value for the resistance, and a read-in circuit 4 for the accuracy to which it is required to adjust the value R. Circuits 2, 4 are connected to a comparator 6. One of the two inputs thereof comprises two terminals 8, 10 adapted to be connected to the terminals of the resistance R. Comparator 6 compares R with $R_o$. The output of comparator 6 is connected to the input of a store and control circuit 12 determining the power of the first pulse of the pulse train transmitted through the resistance of value R and the power increment of the consecutive pulses. The output of circuit 12 is connected to the input of a generator 14 which outputs between two terminals 16 and 18 pulses whose power increases at each consecutive pulse. The pulses can be applied across the resistance R so that the same heats up and oxidizes in the atmosphere, so that the value R changes. A clock circuit 20 controls the repetition frequency of the pulses output by generator 14 and can also control the average width of such pulses.

Figure 2A:
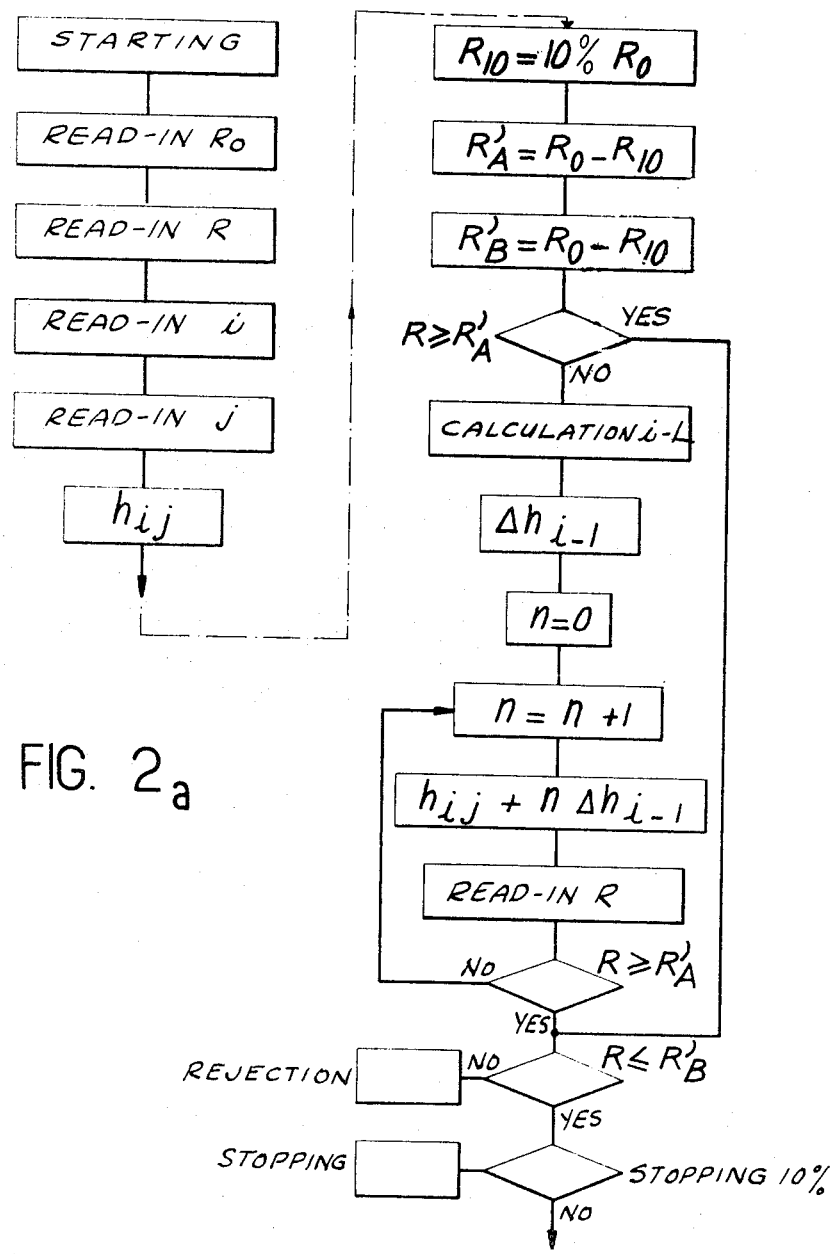

The organization chart shown in FIGS. 2a and 2b is for the first embodiment of the system, logic circuits being used. The organization chart will show more clearly how operations are performed in the system. The operations represented by diamond shaped boxes correspond to questions. In FIG. 2 the end of the 10 percent sequence (stop 10 percent ?) should be assumed to be connected to the beginning of the 1 percent sequence ($R_1 = 1\% R_o$). In FIG. 2:

$R$ = the value of the resistance to be adjusted;
$R_o$ = the required final value of resistance;
$R_{10} = 10\% R_o$
$R_1 = 1\% R_o$
$R_{01} = 0,1\% R_o$
$R'_A = R_o - R_{10}$
$R''_A = R_o - R_1$
$R'''_A = R_o - R_{01}$
$R'_B = R_o + R_{10}$
$R''_B = R_o + R_1$
$R'''_B = R_o + R_{01}$ $R_0$ is read-in as shown by rectangular boxes in FIG. 2A by means of some appropriate means such as encoding wheels. A rank $i$ is allotted to each decase of resistance value from right to left, and $j$ denotes the digit contained in the digit of highest rank $i$. For instance, let the value R of the resistance to be adjusted be 1621.31 ohms and let the required resistance value $R_0$ be 1960.00 ohms, this value to be achieved to an accuracy of 1 percent. The organization chart of FIGS. 2a and 2b shows that the following operations are required:

Read-in of $R_0$ (1960.00 ohms)
Read-in of R (1621.31 ohms)
Read-in of $i$, assumed to be 6
Read-in of $j$, which is the digit contained in the decase
$i = 6$ of $R_0$ — i.e., $j = 1$.

It will be assumed that the generator outputs constant-duration but variable-amplitude — and therefore variable-voltage — pulses. Let $h_{ij}$ denote the initial voltage of the first pulse of the train through the resistance of value R. The values $h_{ij}$ are contained in a store and are determined once and for all in accordance with the nature of the resistance to be adjusted. The index $i$ to be considered in the determination of $h_{ij}$ is the highest rank $i$, and so in the example given $h_{ij}$ will be $h_{61}$. After having read the value of $i$ and $j$, $h_{ij}$ is read in the store containing the $hij$ items. Assume that $h_{61}$ corresponds to 110 volts.

After these preliminary reading operations we go on to the first sequence.

First (10 percent) sequence
This sequence comprises the following steps:
Calculation of $R_{10}$ (196 ohms)
Calculation of $R'_A$ (1764.00 ohms)
Calculation of $R'_B$ (2156.00 ohms).
The question:
$R \geq R'_A$ — i.e., 1,621.31 ohms $\geq$ 1,764.00 ohms?
We therefore assume a negative answer.

Reading of $\Delta h_{i-1}$ — i.e., $\Delta h_5$. $\Delta h_{i-1}$ represents an increase of the voltage $h_i$ imposed by the decase immediately below the decade of greatest weight serving to read-in for $R_0$. The voltage variation between two consecutive pulses is therefore $\Delta h_{i-1}$. The voltage of the first pulse is therefore $h_i$, of the second pulse $h_i + \Delta h_{i-1}$, of the third pulse $h_i + 2 \Delta h_{i-1}$, and so on up to the nth pulse, whose voltage is $h_i + (n-1) \Delta h_{i-1}$. Between each pulse the value of R is measured and compared with $R'_A$. The apparatus therefore reads the value of $\Delta h_{i-1}$ — i.e., $\Delta h_5$ — which we assume to be e.g. 200 mV. The next operations are as follows:

$n$ is taken as 1. A voltage pulse $h_{61} + \Delta h_5$ of 110.2 volts goes through the resistance.
The new value of R, e.g. 1,643.51 ohms, is read.
$R \geq R'_A$ ? — i.e., 1,643.51 $\geq$ 1,764.00 ohms ?
The answer is therefore no.
$n$ is taken as 2. A pulse of amplitude $h_{61} + 2\Delta h_5$, or 110.4 volts goes through the resistance.
The new value of R, e.g., 1,668.35 ohms, is read.
$R \geq R'_A$ ? — i.e., 1,668.35 $\geq$ 1,764.00 ohms?
The reply is no.
Operations then proceed identically up to e.g. $n = 18$.
$n$ is taken as 18. A pulse of amplitude $h_{61} = 18\Delta h_5$, or 111.8 volts goes through the resistance.
The new value of R, e.g., 1,767.61 ohms, is read.
$R \geq R'_A$ ? — i.e., 1,767.61 $\geq$ 17.64.00 ohms?
The answer is yes.
The question $R \leq R'_B$ ? — i.e., 1,767.61<2,156 ohms ? is then asked.
The reply is yes.
The next question is asked, namely has an accuracy of 10 percent (stop 10 percent) been read-in?
Assume that the answer is no.
Second (1 percent) sequence (FIG. 2b)
Calculation of $R_1$ — i.e., 19.60 ohms
Calculation of $R''_A$ — i.e., 1,940.40 ohms
Calculation of $R''_B$ — i.e., 1,979.60 ohms
$R \geq R''_A$ ? — i.e., 1,767.61 ohms $\geq$ 1,940.40 ohms?
The answer is no.
The resistance of value R is then brought to the value $R''_A$ by the application across it of pulses; the voltage of the first pulse is $h_i + n\Delta h_{i-1} + \Delta h_{i-2}$, $\Delta h_{i-2}$ being a voltage increased ordered by the decade $i - 2$, the voltage of the third pulse is $h_i + n\Delta h_{i-1} + 3\Delta h_{i-2}$, and so on up to the pth pulse, whose voltage is $h_i + n\Delta h_{i-1} + p\Delta h_{i-2}$. The sequence of operations is therefore as follows:
Calculation of $i-2$ — i.e., $6-2 = 4$.
Reading of $h_4$ e.g., 100 mV.
$p$ is taken as 1. A pulse having a voltage $h_{61} = 18\Delta h_5 + \Delta h_4$, which we assume to be 113.7 volts, is applied to the resistance.
The new value of R, e.g. 1,771.28 ohms, is read.
$R \geq R''_A$ ? — i.e., 1,771.28 $\geq$ 1,940.40 ohms?
The reply is no.
$p$ is taken as 2. A pulse of 113.80 volts is applied to the resistance.
Let us assume, for instance, that operations proceed in exactly the same way up to $p = 27$.
$p$ is taken as 27. The resistance receives a pulse of voltage $h_{61} + 18\Delta h_5 + 27\Delta h_4$, or 116.3 volts.
The new value of R, e.g., 1,951.87 ohms, is read.
$R \geq R''_A$? — i.e., 1,951.87 $\geq$ 1,940.40 ohms?
The answer is yes.
$R \geq R''_B$ ? — i.e., 1,951.87 $\geq$ 1,979.60 ohms?
The answer is yes.

The following question is then asked: has a 1 percent accuracy been read in? Assume that the answer is yes. Operations then cease. If the answer is no, the 0.1 percent sequence of operations is started. The actual value of the resistance whose assumed value is 1,960 ohms is therefore 1,951.87 ohms, a figure within the required 1 percent accuracy.

Figure 3:
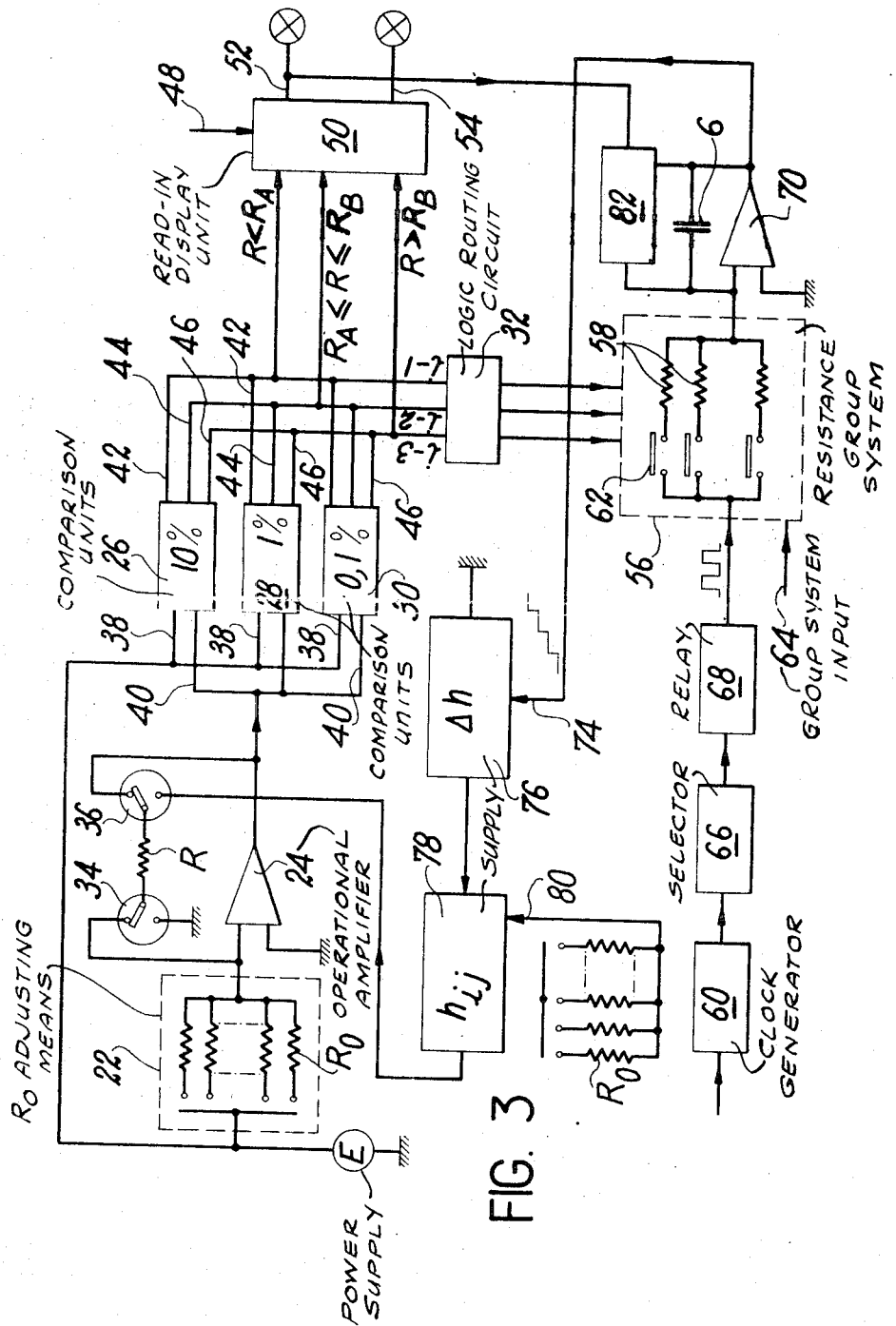
FIG. 3 is a diagrammatic view of the first embodiment.

This embodiment using a logic solution has been described purely by way of explanation and without any limitation. The organization chart of the system as just outlined appears as a logic operations sequence, and so a small computer can be used for these operations, the computer giving instructions to the pulse generator and to the voltage comparator. However, apparatuses which operate without the use of a computer are at present cheaper and faster than those which operate with a computer and need fairly simple theoretical study. FIG. 3 shows an advantageous embodiment of the invention not using a computer.

The comparator for comparizing R and $R_0$ in this embodiment comprises consecutively and in series a power supply E of predetermined value with one side earthed, means 22 whose electrical resistance can be adjusted to $R_0$ by means of a read-in contactor, an operations amplifier 24 having one of its two inputs earthed, and three comparison units 26, 28, 30 providing comparisons to accuracies of 10, 1 and 0.1 percent respectively, and a logic routing circuit 32, in the form of a number of parallel-connected resistances. The resistance of value R to be adjusted can be connected between the unearthed input and the output of the operations amplifier 24 by way of contactors 34, 36.

Each of the three comparison units has two inputs 38, 40 and three outputs 42, 44, 46. The inputs 38 are connected between the power supply E and the means 22 — i.e., to the unearthed side of the power supply E — and the inputs 40 are connected to the output of the operations amplifier 24. A signal appears at output 42 for each comparison unit whenever a comparison made with the accuracy associated with each unit indicates that the value R is below the read-in value $R_0$ — i.e., $R<R_A$.

A signal appears at output 46 whenever comparison shows R to be greater than $R_0$ — i.e., $R>R_B$. At output 44 the comparator indicates if $R=R_0$ with the accuracy allotted to each comparison unit — i.e., 10 percent in the case of unit 26, 1 percent in the case of unit 28 and 0.1 percent in the case of unit 30. All the outputs 42 are interconnected, as are the outputs 44 and 46.

A voltage E is applied to input 38 of each comparison unit and a voltage $V=E\ R/R_0$ is applied to the input 40 of each comparison unit, and so the difference $\Delta V=E-V$, is analyzed. Each unit 26, 28, 30 compares $\Delta V$ with a value $\Delta V_0$ which is a threshold value depending upon the accuracy allotted to each comparison unit. The three outputs of each such unit correspond to the following conditions:

Output 42: $V<E-\Delta V_0$
Output 46: $V>E+\Delta V_0$
Output 44: $E-\Delta V_0 \leq V \leq E+\Delta V_0$.

Output 44 corresponds to the 10 percent or 1 percent or 0.1 percent differential, depending upon the information $\Delta V_0$. Position 46 corresponds to rejection of the resistance under adjustment and position 42 corresponds to an increase by $\Delta h_{i-1}$ of the value $h_{ij}$ of the voltage of the immediately previous pulse applied across the resistance R. If $\Delta V>\Delta V_0$, a further pulse is applied across the resistance with a voltage increase of $\Delta h$. If $\Delta V = \Delta V_0$ the system changes over to the next comparison unit, corresponding to increased accuracy; alternatively, if the accuracy is high enough the adjusting operation ceases.

The required accuracy of adjustment is read in through input 48 of read-in circuit 50. The three outputs of the comparison units are connected to the three inputs $R<R_A$, $R_A \leq R \leq R_B$ and $R>R_B$ of the read-in circuit 50. Output 52 thereof corresponds to the end of adjusting operations and output 54 to rejection of the resistance of value R, rejection occuring only when R is greater than $R_B$.

The three outputs of the comparison units are connected to the three inputs of a logic routing circuit 32 serving to select one of the three comparison units according to the logic state of the three outputs of the comparators. Circuit 32 has three outputs which are connected to three inputs of a system 56 of parallel-connected resistances 58 adapted to be energized by signals output by a clock generator 60 through the agency of relays 62 controlled by the logic signals from the three outputs of the circuit 32 and by the logic state obtained at the contactor of the circuit for reading-in $R_0$ when such circuit is in the position $i$. The logic signals associated with the position of the $R_0$ read-in contactor in the position $i$ are applied to input 64 of group 56. A selector 66 is connected to the output of clock signal generator 60 and serves to select pulse duration, which can be e.g. 4 ms with a pulse period of 10 ms, giving 6 ms for measuring R and controlling the next pulse. Disposed between the output of selector 66 and the input of group 56 is a relay 68 controlling the contactors 34, 36 associated with the terminals of resistance R and synchronizing the pulses applied across resistance R in dependence upon the position of contactors 34 and 36. The output of resistance group 56 is connected to one of the two inputs of an operations amplifier 70 and to a capacitance C; the other input of amplifier 70 is earthed. Capacitance C is connected in parallel between the unearthed input and the output of amplifier 70. The resistances 58 and the capacitance C form a clock signal integrator, and output 72 of amplifier 70 delivers a ladder voltage, the height of the ladder steps being inversely proportional to the value of the parallel-connected resistances 58. The ladder voltage acts via input 74 to control the output voltage of a supply 76 which provides the values of $\Delta h$. The output of supply 76 is connected to the input of a supply 78 which outputs the voltage $h_{ij}$. The latter voltage is constant throughout the adjusting cycle. The supply 78 is controlled at its input 80 by a system whose internal resistance is modified by the $R_0$ read-in contactor. The output of supply 78 can be connected to one side of the resistance R by means of the contactor 36, the other side of the resistance R being earthed.

A zero resetting circuit 82 which is triggered at the end of the adjusting cycle by output 52 of the accuracy read-in circuit 50 is a means of shortcircuiting the capacitance C and thus cancelling the value of $\Delta h$.

The relay 68 can be a mercury relay and the clock signal generator 60 can be energized directly from 50 Hz mains.

The embodiment shown in FIG. 3 can comprise just a single comparison unit 26 or 28 or 30, in which case the value of $\Delta V_o$ is introduced at the end of each sequence.

In this embodiment of the invention, the amplitude of the first pulse applied to resistance R has a value $h_{ij}$ other than zero. The power increase of the pulses is linear, the amplitude increment depending upon the stage of accuracy reached in the adjustment of the resistance R. For instance, in this first embodiment the amplitude increment is $h_{i-1}$ for an accuracy coarser than 10 percent, $\Delta h_{i-2}$ for an accuracy between 10 and 1 percent, and $\Delta h_{i-3}$ for an accuracy between 1 and 0.1 percent. The power increase of the pulses applied to the resistance of value R can therefore be considered to be in the form of three consecutive voltage banks or levels or the like.

As compared with the first embodiment, the second embodiment of the system according to the invention provides faster adjustment of the value R with at least equivalent accuracy and with allowance for the electrical and geometric characteristics of the resistance to be adjusted.

Figure 4:
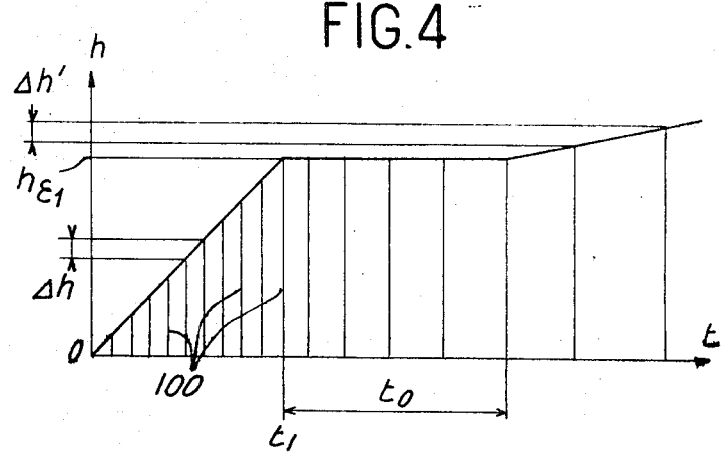
FIG. 4 shows the increase in pulse power and the variation in pulse repetition frequency in the second embodiment.

Referring to FIG. 4, which refers to the second embodiment and which shows the amplitude h of the consecutive pulses 100 of constant width (duration) flowing through the resistance of value R in the time $t$, the growth of the pulses 100 is linear in a first stage from zero amplitude up to an amplitude $n\Delta h = h_{\epsilon_1}$, the amplitude variation between two consecutive pulses being $\Delta h$, this linear growth of the pulses occurring during the time $(0, t_1)$, the instant of time $t_1$ being the instant at which the difference $(R - R_o) = \epsilon$ becomes less than or equal to a predetermined value $\epsilon_1$. The latter represents a percentage of the initial difference $(R-R_o)_o = \epsilon_o$ before adjustment of the resistance. We shall put:

$$\epsilon_2 = x/100 \cdot \epsilon_o,$$

x denoting a number determining an error fraction to be achieved at the time $T_1$. For instance, if $x = 20$, the instant of time $t_1$ is the time when the difference $\epsilon$ during adjustment becomes less than or equal to 20 percent of the initial difference $\epsilon_o$ before adjustment. The values of x as a function of the values of $\epsilon_o$ are entered into a store. In a second adjustment stage having a maximum duration $t_o$, the amplitude of the pulses 100 remains constant at $h_{\epsilon_1}$. If after the time $t_o$ the difference $(R - R_o)$ is greater than the required resistance adjustment accuracy, pulse amplitude increases linearly from $h_{\epsilon_1}$ with an amplitude increment of $\Delta\Delta h$ '. There is therefore a third stage of adjustment which is optional, since the value R is usually achieved with the required accuracy in the second stage of duration $t_o$. The repetition frequency of the pulses 100 is constant in the first stage, then decreasing in the second and third stages, the frequency decrease being dependent upon the difference $\epsilon$. This kind of operation has advantages over the kind of operation used in the first embodiment, for pulse amplitude increases linearly from nil in the first stage, thus obviating determination of the amplitude $h_{ij}$ of the first pulse to go through the resistance R. Also, since the third stage is not usually necessary and since pulse amplitude is constant and equal to $h_{\epsilon_1}$ in the second stage, there is no point in determining the consecutive increments $\Delta h_{i-1}$, $\Delta h_{i-2}$ and so on. Also, the pulse repetition frequency is constant in the first embodiment but decreases in the second and third adjustment stages in the second embodiment, so that the value R can be approached faster at the read-in accuracy.

This advantage is clearly apparent from FIG. 5, which shows the difference $\epsilon$ as a percentage plotted against the time $t$ during adjustment, taking fixed repetition frequencies of 100 Hz (curve A), 50 Hz (curve B) and 25 Hz (curve C) and variable recurrence frequencies of 100 to 25 Hz (curve D) in a single adjusting operation. The required "spread" in FIG. 5 — i.e., the required accuracy for the value R — is between −0.1 percent and +0.1 percent. As will be immediately apparent, the value R cannot be adjusted with the required accuracy (±0.1 percent) at a constant frequency of 100 Hz (curve A). The adjusting time is far too long at a constant frequency of 25 Hz (curve C). When the repetition frequency is modulated as indicated by curve D, the value R is reached much faster with the required accuracy than when a constant frequency of 50 Hz (curve B) is used. In this second embodiment, therefore, resistances can be adjusted with a predetermined accuracy much faster than in the first embodiment.

The embodiment shown in block diagrammatic form in FIG. 6 comprises five read-in circuits, one for each of the five following parameters: read-in circuit 102 for the required end-of-adjustment value $R_o$, read-in circuit 104 for required end-of-adjustment accuracy of R, read-in circuit 106 for maximum duration $t_o$ of the second stage in which the pulses have a constant amplitude $h_{\epsilon_1}$, read-in circuit 108 for the square $\rho_{\square}$ of the resistance to be adjusted, and read-in circuit 110 for the length L of such resistance, the length L representing the geometric parameter of the resistance. The parameters $\rho_{\square}$ L can usefully be involved in resistance adjustment since they enable consideration to be given to the electrical and geometric characteristics of the resistance to be adjusted. The value R of rectangular parallelepipedic resistance — as is the case with thin-layer resistances — is given by the formula:

$$R = \rho L/e \cdot l$$

in which $\rho$ denotes the electrical resistivity of the material, L the length of the resistance, e the thickness of the resistance and $l$ the width of the resistance. The square $\rho_{\square}$ of the resistance is by definition $\rho/e$. The amplitude increments $\Delta h$ and $\Delta h'$ of the pulses going through the resistance to be adjusted are chosen exclusively in dependence upon the values of $\rho_{\square}$ and L and not in dependence upon the difference.

The resistance whose value R is to be adjusted to the value $R_o$ read-in by circuit 102 is connected to one of the two inputs of a comparator 112 for comparing R and $R_o$ (the comparators being denoted by the abbreviation "Comp" in FIG. 6), and the value $R_o$ is applied to the second input of the comparator, which can be e.g. a measuring bridge constructed as a Wheatsone bridge, one of the bridge arms including $R_o$ and another bridge including R. Comparator 112 outputs a signal whose amplitude is proportional to the difference $(R - R_o)$. Before R starts to be adjusted this difference is $\epsilon_o = (R - R_o)_o$. A store group 114 is used to output a difference $\epsilon_1$ corresponding to a predetermined percentage of the initial difference $\epsilon_o$. Accordingly, the store system 114 comprises a store 116 for the value $\epsilon_o$ introduced immediately before adjustment (the stores being denoted by the abbreviation "Mem" in FIG. 6), a store 118 comprising values $x$ which are a function of $\epsilon_o$, $x$ being a number representing a fraction of the initial difference $\epsilon_o$, and a store 120 containing the value $\epsilon_1 = \cdot x/100 \cdot \epsilon_o$. A comparator 122 for comparing the values $\epsilon$ and $\epsilon_1$ receives the value $\epsilon_1$ from the system 114 at one of its two inputs and the value $\epsilon$ from the output of the comparator 112 at its other input. Comparator 122 has three outputs, one for each of the three possible cases $\epsilon > \epsilon_1$, $\epsilon = \epsilon_1$ and $\epsilon > \epsilon_1$. The values R and $R_o$ are compared after the passage of each pulse through the resistance to be adjusted. A clock circuit 124 mainly comprising a frequency generator 126 (marked G(f)) is controlled either by a fixed-frequency control circuit 128 or by a circuit 130 whose frequency is modulated by $\epsilon$. The clock circuit 124 has three inputs; the first input, which forms the input of the fixed-frequency circuit 128, is connected to the $\epsilon > \epsilon_1$ output of comparator 122, and the other two inputs form the two inputs of the modulated-frequency circuit 130, one such input being connected to the $\epsilon \leqslant \epsilon_1$ output of comparator 122 and the other being connected to the output of the $R/R_o$ comparator 112, so that there can be frequency modulation by $\epsilon$. The output of clock circuit 124 is connected in parallel to the inputs of three pulse generators 132, 134, 136. Generator 132 is used for the first adjustment stage and outputs pulses having a voltage amplitude $n \cdot \Delta h$, $n$ denoting the $n$th pulse delivered during the first stage and $\Delta h$ denoting the amplitude increment, these pulses having a constant repetition frequency. Pulse generator 134 is used for the second adjustment stage and outputs pulses which have a constant amplitude $h_{\epsilon_1}$ and whose repetition frequency decreases in dependence upon the value of $\epsilon$. The generator 136 used for the third optional stage of adjustment outputs pulses having an amplitude $h_{\epsilon}$ $1 + p\Delta h'$, $p$ denoting the $p$th pulse delivered during the third stage and $\Delta h'$ denoting the amplitude increment. This embodiment also has too a store 138 containing values of $\Delta h$ and a store 140 containing values of $\Delta h'$. The two stores 138, 140 and the $x$-value store 118 are internal devices and theoretically inaccessible to the user. Values of $\Delta h$ and $\Delta h'$ can be selected by means of two selector circuits 142 and 144 respectively; these two circuits are controlled by the $\rho_n$ read-in circuit 108 and by the L read-in circuit 110. The output of the $\Delta h$ selector circuit 142 is connected to one of the two inputs of generator 132 whose other input is connected to the output of clock circuit 124. The output of the $\Delta h'$ selector circuit 114 is connected to one of the three inputs of generator 136 via a generator 146 outputting pulses of amplitude $p \cdot \Delta h'$, p denoting the $p$th pulse. The other two inputs of the generator 136 are connected the one to the output of the clock circuit 124 and the other to the output of a store 148 containing the value $h_1$, which is also applied to one of the two inputs of pulse generator 134. Generator 136 operates only if the resistance of value R has not been adjusted with the instructed accuracy at the end of the second stage of duration $t_o$. To this end, the circuit 106 for reading-in the maximum adjustment time $t_o$ is connected to one of the two inputs of a trigger circuit 150 controlling generator 146. The second input of circuit 150 is connected to the output of a timer 152 whose input is connected to the $\epsilon = \epsilon_1$ output of comparator 122. The latter output is also connected to one of the two inputs of the $h_{\epsilon_1}$ store 148 and to input 154 of means 156 for selecting one of the generators 132, 134, 136. Input 154 controls starting of the generator 134, input 158 controls starting of the generator 132 and input 160 controls starting of the generator 136. The output of the selector means 156 is connected to a power amplifier 162 which outputs the pulses for going through the resistance of value R which it is required to adjust. The output of amplifier 162 is also connected to the second input of store 148 so as to store the value of the amplitude $h_{\epsilon_1}$, the entry of $h_{\epsilon_1}$ into store 148 being controlled by the $\epsilon = \epsilon_1$ output of comparator 122. A comparator 164 compares $\epsilon$ with the accuracy value read-in via circuit 104 and is connected to a circuit 166 for stopping and zero resetting the adjusting facility and to a circuit 168 for rejecting the resistance to be adjusted. All the stores except 118, 138 and 140 store their date for only a single adjustment cycle. A predetermined maximum total adjustment time covering all three stages can be read-in by a read-in circuit which is not shown; the same can at start-up trigger a clock which at the end of the total time triggers the reject circuit 168.

As an example to show how the second embodiment of the invention operates, we will assume that $R_o$ is 10,000 ohms, R is 9,500 ohms and the accuracy instructed by circuit 104 is 0.1 percent. When the $R_o$, accuracy, $t_o$, $\rho_n$ and L parameters are read-in and the resistance which it is required to adjust is connected to the comparator 112, the same outputs $\epsilon = \epsilon_n = 500$ ohms. Store 118 outputs the value $x$ corresponding to $\epsilon_n$, e.g. $x = 80$, whence:

$$\epsilon_1 = 80/100 \, \epsilon_n = 400 \text{ ohms.}$$

The value $\epsilon_1 = 400$ ohms is stored in store 120 and made available to comparator 122. $\Delta h$ and $\Delta h'$ are selected in the stores by 142 and 144 respectively and made available to the pulse generators. As an example, it will be assumed that $\Delta h = 1$ volt and $\Delta h' = 0.1$ volt. Upon the completion of the adjustment operation the clock circuit 124 outputs a fixed frequency e.g., of 100 Hz via 128. The generator selector means 156 are then connected to the output of generator 132. Upon the triggering thereof, a bank or level of pulses is applied by way of power amplifier 162 to the resistance to be adjusted, the amplitude between consecutive pulses increasing by an increment $\Delta h$ of 1 volt. When $\epsilon$ becomes $\epsilon_1$ — i.e., when $R = 9,600$ ohms in the example chosen — the $\epsilon/\epsilon_1$ comparator 122 outputs a signal at its $\epsilon = \epsilon_1$ output, and such signal causes storage of the height of the last impulse to be output by the generator 132, $n\Delta h = h_{\epsilon_1} =$ e.g., 100 volts. The $\epsilon = \epsilon_1$ output connects the selector means 156 to the output of the generator 134 which delivers pulses having a constant amplitude $h_{\epsilon_1} = 100$ volts. The frequency of these pulses ceases to be constant and becomes dependent upon the difference $\epsilon$ (in the example chosen, 100 Hz for $\epsilon = \epsilon_1$ and 5 Hz for $\epsilon =$ the read-in accuracy, the latter frequency varying in accordance with a predetermined variation pattern). The $\epsilon = \epsilon_1$ output of comparator 122 also starts the timer 152 for timing the second adjustment stage. If the difference $\epsilon$ is still outside the read-in via circuit 104 at the end of the time $t_o$ read-in via circuit 106, the trigger circuit 150 acts to connect the selector means 156 to the output of the generator 136 delivering pulses of amplitude $h_{\epsilon_1} + p\Delta h'$ — i.e., 100 volts + $p$.0.1 volt, the generator $p\Delta h'$ being triggered simultaneously. The system then operates without any limitation on total adjustment time until the difference $\epsilon \leq \pm 0.1$ percent. Comparator 164 then triggers circuit 166 which stops and zero resets the system. Having a fixed starting frequency of 100 Hz helps to reduce the total time required for adjustment, and the 5 Hz frequency near the end of operations makes for excellent accuracy due to reduced heating of the resistance by the pulses flowing through it.

The four generators 132, 134, 136, 146, their selector means 156 and the $h_{\epsilon_1}$ store 158 and possible the amplifier 162 can be grouped together to form a single program supply. One way of storing $h_{\epsilon_1}$ is to block the programmed supply or feed at the $h_{\epsilon_1}$ output level. The foregoing description of the embodiment of FIG. 6 is based on four generators 132, 134, 136, 146 for the sake of clarity and to make it easier to understand the operation of this second embodiment.

We claim

1. A system for adjusting the value R of a resistance to a predetermined value $R_o$, R being modified by oxidation of the resistance by the flow therethrough of an electrical pulse train, comprising a resistance of value R, at least two read-in circuits, one for reading-in the value $R_o$ and the other for reading-in the required accuracy of the value R, a comparator having two inputs, one of said inputs having two terminals and being connectable across said resistance, the other of said inputs being connected to said read-in circuit for the value $R_o$, said comparator comparing R and $R_o$, an output for said comparator, a store and control circuit, an input for said circuit connected to said comparator output, said circuit determining the power of the first electrical pulse and the power increment of the pulses, a generator producing the pulses, an output for said generator, an output for said circuit connected to said generator input, a generator output connected to at least one of the two ends of said resistance of value R, a clock circuit connected to said generator for selecting the repetition frequency and the average width of the pulses, and a selector connecting the terminals of said resistance of value R alternately to said comparator input terminals and to said generator output terminals.

2. A system according to claim 1,
said comparator including a reference power supply, one side of said supply being grounded, adjustable electrical resistance means, a read-in contactor for said resistance means, said resistance means being adjusted to value $R_o$ by said read-in contactor, an operations amplifier, one of the inputs of said amplifier being grounded, an ungrounded input and an output for said amplifier, said resistance of value R being connected in parallel between said ungrounded input and said output of said amplifier, said power supply, said last-mentioned means and said amplifier being connected in series, a plurality of comparison units each having a particular and different accuracy connected in parallel and each having two inputs and three outputs, one of said last-named two inputs being directly connected to an ungrounded terminal of said reference power supply, the other of said last-named inputs being connected to said operations amplifier output, first and third outputs of said three outputs of said comparison units furnishing a signal if R is below or above $R_o$ at the accuracy allotted to each of said comparison units and said two putputs indicating if R is equal to $R_o$ at the accuracy allotted to each of said comparison units, and a logic routing circuit, three outputs for said logic circuit receiving data from said comparison units and selecting one of said outputs of said comparators, and said $R_o$ read-in circuit, said store and control circuit and said generator including a group of resistances energized by signals from said clock circuit, a relay connected to said resistances controlled by the data from said three outputs of said logic routing circuit, said relay also being controlled by the signal output of said logic circuit when said $R_o$ read-in contactor is in a position distinctive of the rank of the highest decade of the value of $R_o$, an operations amplifier and a capacitance connected in parallel to the output of said group of resistances, said capacitance and said operations amplifier comprising a clock signal integration circuit delivering a ladder voltage, two series connected supplies, one connected to and controlled by the ladder voltage from said operations amplifier and the other of said supplies having its output connected to one of said two terminals of said resistance of value R, said other supply being controlled by said $R_o$ read-in contactor.

3. A system according to claim 1,
said selector being a relay.

4. A system according to claim 2, the predetermined accuracy for each of said comparison units being read-in by a voltage representing accuracy supplied to said units.

5. A system according to claim 1 in which the amplitude of the electrical pulses flowing through the resistance of value R grows linearly in a first stage with an amplitude increment of $\Delta h$ which depends upon the two values of the square of the resistance and upon a parameter characteristic of the geometry of the resistance to be adjusted, the increment being anywhere from zero to the value $h_{\epsilon_1}$ at which the difference $(R - R_o) = \epsilon$ being adjusted becomes equal to a predetermined fraction $\epsilon_1$ of the initial difference $\epsilon_n = (R - R_o)_o$ before adjustment; in a second stage the amplitude is constant at a value $h_{\epsilon_1}$ for a maximum time $t_o$; and in a third optional stage occurring only if the difference $\epsilon$ is greater than the required accuracy of adjustment of the resistance of value R, the amplitude increases linearly at an amplitude increment of $\Delta h'$, the pulse frequency being constant in the first stage and then decreasing in the second and third stages, the decrease being dependent upon the difference $\epsilon$, the same being measured after each of the pulses has flowed through the resistance R.

6. A system according to claim 5, having a read-in circuit for each of the values $R_o$, $t_o$, $P_n$, the parameter characteristic of geometry and the required end-of-adjustment accuracy for R, a store for each of the values $\epsilon_n$, $\epsilon_1$, $\Delta h$, $\Delta h'$ and $h_{\epsilon_1}$, a comparator comparing R and $R_o$ and initially providing $\epsilon_a$, which is then placed in the $\epsilon_a$ store, then $\epsilon$, a $\epsilon$ and $\epsilon_1$ comparator having two inputs, one connected to the $\epsilon_1$ store and the other connected to the output of the $R/R_o$ comparator and having three outputs corresponding to $\epsilon > \epsilon_1$, $\epsilon = \epsilon_1$ and $\epsilon \epsilon_1$, a pulse generator for each of the stages, the first generator providing pulses having a linearly increasing amplitude $n \Delta h$, $n$ being the $n$th pulse transmitted in the first stage, the second generator providing pulses of constant amplitude $h_{\epsilon_1}$, the third generator providing pulses of linearly increasing amplitude $h_{\epsilon_1} + p\Delta h'$, $p$ being the $p$th pulse transmitted in the third stage, means for selecting one of the generators, means for selecting the value of $\Delta h$ and of $\Delta h'$ in the respective stores, said selecting means being controlled by the read-in circuits for $P_a$ and for the geometric parameter and controlling the first and third generators, a trigger circuit controlling the third generator, said trigger circuit having two inputs, one connected to a timer and the other connected to the $t_o$ read-in circuit, a clock circuit controlling the first generator at a fixed repetition frequency through its input connected to the $\epsilon > \epsilon_1$ output of the $\epsilon/\epsilon_1$ comparator and controlling the second and third generators at a repetition frequency modulated by $\epsilon$ through its input connected to the $\epsilon \leq = \epsilon_1$ output of the comparator, and an "accuracy" comparator having two inputs, one connected to the "accuracy" read-in circuit and the other connected to the output of the $R/R_o$ comparator, said "accuracy" comparator having two outputs, one controlling a stop and zero reset circuit for the adjusting system, the other output controlling a reject circuit for the resistance of value R, the $\epsilon = \epsilon_1$ output of the $\epsilon/\epsilon_1$ comparator being connected to the generator selecting means and to the timer and to the $h_{\epsilon_1}$ store, said store being connected to the second and third generators, the selecting means being controlled by the $\epsilon > \epsilon_1$ output and by the output of the trigger circuit.

7. A system according to claim 6, the three pulse generators for the three stages, the means for selecting one of the generators, and the $h_{\epsilon_1}$ store being single programmable supply.

* * * * *